US012495057B1

(12) United States Patent
Kissos et al.

(10) Patent No.: US 12,495,057 B1
(45) Date of Patent: Dec. 9, 2025

(54) CONTEXTUAL ANOMALY DETECTION IN ACTIVITY LOGS

(71) Applicant: Sweet Security Ltd., Tel-Aviv (IL)

(72) Inventors: Ido Kissos, Netanya (IL); Orel Ben Ishay, Magshimim (IL); Tomer Filiba, Tel Aviv (IL); Yigael Berger, Rehovot (IL); Shlomo Kushchi, Rehovot (IL)

(73) Assignee: Sweet Security Ltd., Tel-Aviv (IL)

( * ) Notice: Subject to any disclaimer, the term of this patent is extended or adjusted under 35 U.S.C. 154(b) by 0 days.

(21) Appl. No.: 19/014,323

(22) Filed: Jan. 9, 2025

(51) Int. Cl.
*H04L 9/00* (2022.01)
*H04L 9/40* (2022.01)

(52) U.S. Cl.
CPC ........ *H04L 63/1425* (2013.01); *H04L 63/083* (2013.01); *H04L 63/1433* (2013.01)

(58) Field of Classification Search
CPC .............. H04L 63/1425; H04L 63/083; H04L 63/1433
USPC ......................................................... 726/26
See application file for complete search history.

(56) References Cited

U.S. PATENT DOCUMENTS

| 12,166,776 | B1* | 12/2024 | Pierce, Jr. | ............ G06N 3/0455 |
| 2023/0198949 | A1* | 6/2023 | Zhou | ...................... H04L 63/20 |
| | | | | 726/11 |
| 2024/0135261 | A1* | 4/2024 | Diwanji | .................. G06F 16/26 |
| 2024/0311579 | A1* | 9/2024 | Dong | ..................... G06F 40/284 |
| 2024/0320338 | A1* | 9/2024 | Chhetri | .................. G06F 21/566 |
| 2024/0412042 | A1* | 12/2024 | Savinov | ............... G06N 3/0455 |
| 2025/0039134 | A1* | 1/2025 | Roquemore | .......... H04L 9/3247 |
| 2025/0061194 | A1* | 2/2025 | Grover | .................. G06F 21/554 |
| 2025/0094569 | A1* | 3/2025 | Chen | ..................... G06F 21/552 |
| 2025/0097171 | A1* | 3/2025 | Hu | ............................. G06F 8/35 |

* cited by examiner

*Primary Examiner* — Christopher J Brown

(57) ABSTRACT

There is provided a method of using a large language model (LLM) for controlling access to a computing cloud, comprising: accessing a log of activity of sessions of the computing cloud, tokenizing the sessions, feeding the tokenized sessions into the LLM, obtaining a loss function per token of the tokenized sessions, computing a session loss for each respective session as an aggregation of the loss function for tokens associated with the respective session, identifying a session including an anomaly associated with a security risk when the session loss of the session is greater than a first threshold, for the identified session, identifying a token(s) having the loss function greater than a second threshold, wherein the identified token(s) denotes the anomaly associated with the security risk, identifying an access event associated with the identified token(s), the access event associated with the security risk, and instructing access control for the access event.

12 Claims, 8 Drawing Sheets

```
tenant_id: cf787fcf-194c-4d39-8f63-3f0465913b7b
account_id: '533096274336'
arn: arn:aws:iam::533096274336:role/blood-platinum-cross-account-access
principal_id: AROAXYHYDTGQJYSRPQIWW
username: blood-platinum-cross-account-access
ips_origin:
- US
- VPC
ips_asn:
- US
- VPC
ips:
- 10.0.24.61
- 18.188.153.30
agents:
- aws-sdk-go-v2/1.26.1
day_of_week: Sunday
hour_of_day: 2
session_start: '2024-08-11T02:06:08'
duration: 1
response_code:
   OK: 20
   AccessDenied: 1
sequence:
- us-west-2|DescribeInstances|ec2.amazonaws.com|OK
- us-east-2|GetBucketAcl|s3.amazonaws.com|OK
- ap-northeast-3|DescribeInstances|ec2.amazonaws.com|OK
- us-east-1|DescribeInstances|ec2.amazonaws.com|OK
- eu-north-1|DescribeInstances|ec2.amazonaws.com|OK
- ap-northeast-2|DescribeInstances|ec2.amazonaws.com|OK
- ap-northeast-1|DescribeInstances|ec2.amazonaws.com|OK
- us-east-2|GetSecretValue|secretsmanager.amazonaws.com|AccessDenied
- us-east-1|ListBuckets|s3.amazonaws.com|OK
- eu-west-3|DescribeInstances|ec2.amazonaws.com|OK
- sa-east-1|DescribeInstances|ec2.amazonaws.com|OK
- eu-central-1|DescribeInstances|ec2.amazonaws.com|OK
- ca-central-1|DescribeInstances|ec2.amazonaws.com|OK
- us-east-2|DescribeInstances|ec2.amazonaws.com|OK
- ap-southeast-2|DescribeInstances|ec2.amazonaws.com|OK
- ap-southeast-1|DescribeInstances|ec2.amazonaws.com|OK
- eu-west-1|DescribeInstances|ec2.amazonaws.com|OK
- eu-north-1|GetBucketAcl|s3.amazonaws.com|OK
- ap-south-1|DescribeInstances|ec2.amazonaws.com|OK
- eu-west-2|DescribeInstances|ec2.amazonaws.com|OK
- us-west-1|DescribeInstances|ec2.amazonaws.com|OK
```

```
Custom Tokens
ListRoles|
ListGroups|
ListUsers|
GetTaskProtection|
ListBuckets|
SendCommand|
RegisterContainerInstance|
DeleteCertificate|
GetBucketVersioning|
ConsoleLogin|
AssumeRole|
CreateRole|
CreateInstanceProfile|
CreateAssociation|
CreateDocument|
PutRolePolicy|
DescribeRepositories|
StartSession|
DescribeAccount|
ListDelegatedAdministrators|
ListAccessKeys|
CreateKeyPair|
DeleteKeyPair|
AddRoleToInstanceProfile|
DeleteFlowLogs|
AttachRolePolicy|
RequestCertificate|
CreateRoute|
```

CONTEXTUAL ANOMALY DETECTION IN ACTIVITY LOGS

BACKGROUND

The present invention, in some embodiments thereof, relates to cybersecurity and, more specifically, but not exclusively, to cybersecurity of a target computing environment.

There are many types of cybersecurity risks to a target computer environment such as a computing cloud, for example, data breaches, where sensitive information is exposed; denial-of-service (DOS) attacks, disrupting cloud availability; and misconfigurations, such as poorly secured storage buckets, leaving systems vulnerable. Insider threats and malware can compromise cloud infrastructure, while weak access controls enable unauthorized access. Shared cloud environments also pose risks of side-channel attacks between tenants.

SUMMARY

According to a first aspect, a computer implemented method of using a large language model (LLM) for controlling access to a computing cloud, comprises: accessing a log of activity of a plurality of sessions of the computing cloud, tokenizing the plurality of sessions into a plurality of tokenized sessions, feeding the plurality of tokenized sessions into the LLM, obtaining from the LLM, a loss function per token of the plurality of tokenized sessions, computing a session loss for each respective session of the plurality of sessions, the session loss computed as an aggregation of the loss function for tokens associated with the respective session, identifying a session including an anomaly associated with a security risk when the session loss of the session is greater than a first threshold, for the identified session, identifying at least one token having the loss function greater than a second threshold, wherein the identified at least one token denotes the anomaly associated with the security risk, identifying at least one access event associated with the identified at least one token denoting the anomaly, the at least one access event associated with the security risk, and instructing access control for the at least one access event.

According to a second aspect, a computer implemented method of using a large language model (LLM) to control access to a computing cloud, comprises: accessing a log of activity of a plurality of sessions of the computing cloud, tokenizing the plurality of sessions into a plurality of tokenized sessions, feeding the plurality of tokenized sessions into the LLM, obtaining from the LLM, a loss function per token of the plurality of tokenized sessions, computing a session loss for each respective session of the plurality of sessions, the session loss computed as an aggregation of the loss function for tokens associated with the respective session, identifying a session including an anomaly associated with a security risk when the session loss of the session is greater than a first threshold, for the identified session, identifying at least one token having the loss function greater than a second threshold, wherein the identified at least one token denotes the anomaly associated with the security risk, and for the session associated with the anomaly, generating a heatmap of the plurality of tokens associated with the session, each respective token is visually indicated according to the loss function of the respective token.

According to a third aspect, a computer implemented method of training a LLM for controlling access to a computing cloud, comprises: accessing a historical log data of a computing cloud, structuring the historical log data into a plurality of structured session, tokenizing the plurality of structured sessions into a plurality of tokenized sessions, and training the LLM on the plurality of tokenized sessions for detecting an anomaly on a token level and/or on a session level, the anomaly indicating an access event posing a security risk within the computing cloud.

In a further implementation form of the first, second, and third aspects, the LLM is trained by: accessing a historical log data of a computing cloud, structuring the historical log data into a plurality of structured session, tokenizing the plurality of structured sessions into a plurality of tokenized sessions, and fine-tuning a pre-trained LLM on the plurality of tokenized sessions, wherein the pre-trained LLM is pre-trained on a corpus of human readable natural language text.

In a further implementation form of the first, second, and third aspects, further comprising: terminating the session for reducing or preventing the security risk.

In a further implementation form of the first, second, and third aspects, further comprising: for the session associated with the anomaly, generating a heatmap of the plurality of tokens associated with the session, each respective token is visually indicated according to the loss function of the respective token.

In a further implementation form of the first, second, and third aspects, further comprising: structuring the log into a plurality of structured sessions, wherein tokenizing comprises tokenizing the plurality of structured sessions into a plurality of tokenized sessions.

In a further implementation form of the first, second, and third aspects, the plurality of tokenized sessions are fed into the LLM as a sequence.

In a further implementation form of the first, second, and third aspects, the session associated with the anomaly includes at least one of: unexpected API call sequence, unusual account activity, deviations in access patterns across services, a listing of an S3 bucket following an unauthorized IAM role assumption, co-occurrence of specific API calls with anomalous IP addresses, and specific API calls occurring during unusual timeframe of activity.

In a further implementation form of the first, second, and third aspects, the plurality of tokenized sessions includes syntactic and/or semantic context of sequences of tokens of the sessions.

In a further implementation form of the first, second, and third aspects, each session of the plurality of sessions comprises an aggregation of a plurality of related access events into a single session.

In a further implementation form of the first, second, and third aspects, access events are aggregated into the single session based on at least one of: a common resource name, maximal time window between consecutive access events that indicates tokens belong to a same access event, and association with an access token to designate a new connection.

In a further implementation form of the first, second, and third aspects, the tokenizing is performed by adding custom tokens indicating domain-specificity, and/or identifiers without semantic significance.

In a further implementation form of the first, second, and third aspects, the tokenization is performed by byte-pair encoding tokenization followed by adding the custom tokens.

In a further implementation form of the first, second, and third aspects, training the LLM comprises fine-tuning a pre-trained LLM to create the LLM for detecting the anomaly indicating the security risk.

In a further implementation form of the first, second, and third aspects, the pre-trained LLM is pre-trained on a corpus of human readable natural language text.

In a further implementation form of the first, second, and third aspects, the fine-tuning is performed by adjusting a loss function to output a cross-entropy loss on a token level.

In a further implementation form of the first, second, and third aspects, the loss function is processed to compute a session loss function that normalizes loss amplitude of super-fields.

In a further implementation form of the first, second, and third aspects, the super-fields are selected from: identity fields, fingerprint fields, and sequence fields.

In a further implementation form of the first, second, and third aspects, the historical log data comprises raw non-filtered historical log data for accounts of the computing cloud.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4 is an example of a structured session, in accordance with some embodiments of the present invention;

FIG. 5 includes examples of customized tokens, in accordance with some embodiments of the present invention;

FIG. 6 includes additional examples of customized tokens, in accordance with some embodiments of the present invention;

FIG. 7 depicts an example of a heatmap, in accordance with some embodiments of the present invention.

DETAILED DESCRIPTION

Figure 1:
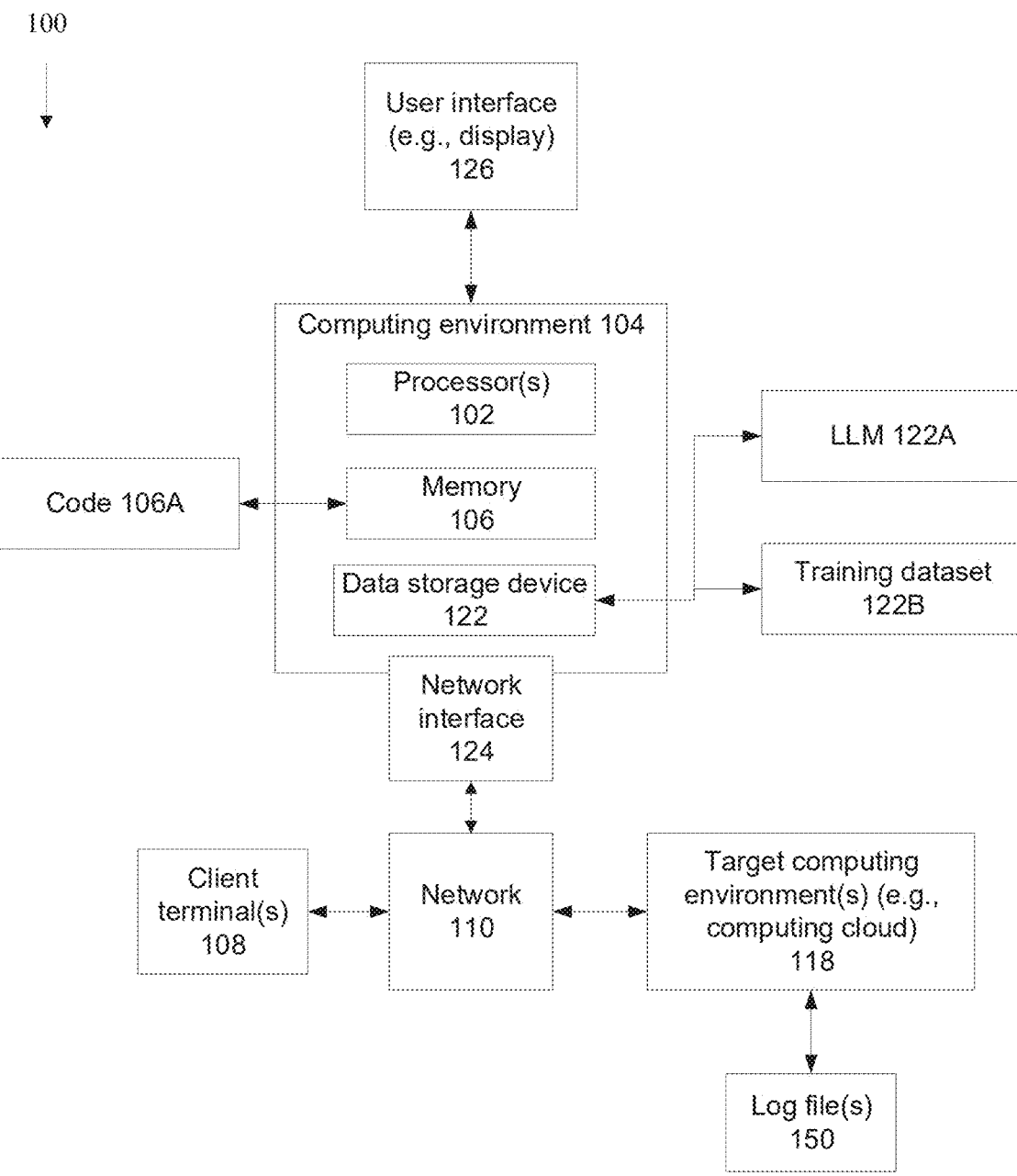
FIG. 1 is a block diagram of components of a system for using a for detecting an anomaly in a session of a target computing environment, in accordance with some embodiments of the present invention.

The present invention, in some embodiments thereof, relates to cybersecurity and, more specifically, but not exclusively, to cybersecurity of a target computing environment.

As used herein, the term computing cloud is used as a not necessarily limiting example of a target computing environment. It is to be understood that the term computing cloud is not necessarily limiting, and other implementations of the target computing environment may be used as alternatives to the computing cloud.

An aspect of some embodiments of the present invention relates to systems, methods, computing devices, and/or code instructions (e.g., stored on a data storage device and executable by one or more processors) for using a large language model (LLM) for controlling access to a target computing environment, optionally a computing cloud. A log of activity of sessions of the computing cloud is accessed. The sessions are tokenized to create tokenized sessions. The tokenized sessions are fed into a LLM (e.g., Autoregressive LLM). The tokenized sessions may be fed as both the prompt and the label. The LLM may output the positional logits, which may be converted to vocabulary probabilities for each position, for example, by applying a Softmax function. Optionally, the negative log-likelihood (NLL) may be calculated for the index corresponding to the true label. The concatenation of those outputs may yield a loss per token list, corresponding to the positional session tokens. A session loss is computed for each respective session as an aggregation of the loss function for the tokens associated with the respective session. A session including an anomaly is identified when the session loss of the session meets a requirement, for example, greater than a first threshold. The identified anomaly may be associated with a security risk, such as malicious action. One or more tokens meeting a second requirement may be identified when the loss function meets a second requirement, for example, greater than a second threshold. The identified token(s) may represent the anomaly of the session, which may be associated with the security risk.

Optionally, one or more access events associated with the token(s) denoting the anomaly are identified. The access event(s) may be associated with the security risk, for example, represent a malicious action. Access control for the access event(s) may be instructed.

Instructing access control may include one or more of: the access event and/or anomalous session is automatically terminated and/or disconnected, the access event and/or anomalous session is automatically paused until a condition is met such as a validation process, access requirements for the session are hardened (e.g., the current access requirements are re-evaluated in terms of the hardened requirements, and the validation process may be triggered accordingly), a user is requested to undergo a validation procedure to proceed with the access event and/or anomalous session, a security application is automatically triggered to scan the access event and/or anomalous session and/or associated data for malware and/or security breaches, the access event and/or anomalous session may be executed in a sandbox, an alert on an administrative server may be generated requesting a review by an administrator, and the like.

Alternatively or additionally, a heatmap of the tokens associated with the session associated with the anomaly may be generated. Each respective token may be visually indicated according to the loss function of the respective token. The heatmap may be used, for example, to help determine if abnormal activity is occurring, which is associated with security risk.

An aspect of some embodiments of the present invention relates to systems, methods, computing devices, and/or code instructions (e.g., stored on a data storage device and executable by one or more processors) for training a LLM for controlling access to a computing cloud. A historical log data of a computing cloud is accessed. The historical log data is structured into multiple structured sessions. The structured sessions are tokenized to create tokenized sessions. The LLM may be trained on the tokenized sessions. The LLM may be trained by fine-tuning a pre-trained LLM. The pre-trained LLM may be pre-trained on a corpus of human readable natural language text or machine-generated text. The LLM may be trained for detecting an anomaly on a token level and/or on a session level. The anomaly may indicate an access event posing a security risk within the computing cloud.

At least one embodiment described herein addresses the technical problem of controlling access within a target computing environment, optionally a computing cloud, optionally for reducing risk of a security threat, such as unauthorized access to data and/or services, manipulation (e.g., deletion, changing) of data hosted by the computing cloud, installation of malicious code, and the like. The environment of a computing cloud is particularly prone to security breaches, for example, due to the large number of accounts which are simultaneously serviced by the computing cloud, due to remote access via virtual interfaces, due to the large number of simultaneous accesses, due to the large amount of data and/or services hosted by the computing cloud, and the like. At least one embodiment described herein improves upon the technology of cybersecurity, in particular, providing cybersecurity for a target computing environment, optionally a computing cloud. At least one embodiment described herein improves upon prior approaches of providing cybersecurity, in particular, providing cybersecurity for a target computing environment, optionally a computing cloud.

At least one embodiment described herein addresses the aforementioned technical problem, and/or improves upon the aforementioned technical field, and/or improves upon existing approaches described herein, by using a large language model (LLM) for controlling access to a target computing environment, optionally a computing cloud. A log of activity of sessions of the computing cloud is accessed. The sessions are tokenized to create tokenized sessions. The tokenized sessions are fed into the LLM. A loss function per token of the tokenized sessions is obtained from the LLM. A session loss is computed for each respective session as an aggregation of the loss function for the tokens associated with the respective session. A session including an anomaly is identified when the session loss of the session meets a requirement, for example, greater than a first threshold. The identified anomaly may be associated with a security risk, such as malicious action. One or more tokens meeting a second requirement may be identified when the loss function meets a second requirement, for example, greater than a second threshold. The identified token(s) may represent the anomaly of the session, which may be associated with the security risk.

At least one embodiment described herein provides the practical application of controlling access to the target computing environment, optionally computing cloud, based on identification of an access event associated with an anomalous token and/or anomalous session identified based on output of the LLM fed a log of activity of the computing cloud. Instructing access control may include one or more of: the access event and/or anomalous sessions is automatically terminated and/or disconnected, the access event and/or anomalous session is automatically paused until a condition is met such as a validation process, access requirements for the session are hardened (e.g., the current access requirements are re-evaluated in terms of the hardened requirements, and the validation process may be triggered accordingly), a user is requested to undergo a validation procedure to proceed with the access event and/or anomalous session, a security application is automatically triggered to scan the access event and/or anomalous session and/or associated data for malware and/or security breaches, the access event and/or anomalous session may be executed in a sandbox, an alert on an administrative server may be generated requesting a review by an administrator, and the like.

Alternatively or additionally, at least one embodiment described herein provides the practical application of controlling access to the target computing environment, optionally computing cloud, based on generation of a heatmap of the tokens associated with the session associated with the anomaly may be generated. Each respective token may be visually indicated according to the loss function of the respective token. The heatmap may be used, for example, to help determine if malicious activity is occurring, such as by visually identifying the tokens most likely associated with the security risk.

At least one embodiment described herein relates to training and/or using a trained LLM for identifying complex patterns and/or anomalies in cloud infrastructure activity. By grouping and analyzing user and system behaviors, the LLM is able to capture nuanced relationships that often characterize activity with malicious intent, delivering high-accuracy alerts across gigabyte-scale logs in real-time. In experiments conducted by the Inventors, the approach based on embodiments described herein achieved outstanding recall (high detection rate, >99.9%) and precision (low false-positive rate, <e-4) on customer data, ensuring reliable anomaly detection at scale.

Logs (e.g., of a computing cloud) exhibit various complex patterns and/or anomalies, for example, unexpected API call sequences, unusual account activity, and/or deviations in access patterns across services. For example, an otherwise benign action, such as listing S3 buckets, is determined to be suspicious when it follows an unauthorized IAM role assumption. The LLM excels at identifying these nuanced relationships, such as the co-occurrence of specific API calls with anomalous IP addresses and/or unusual timeframes of activity. By analyzing sequences holistically using embodiments described herein, the LLM is able to discern the difference between typical operational workflows and potential threat behaviors, even when individual events in isolation appear normal.

Unlike traditional time-series or statistical-based anomaly detection solutions that operate within limited dimensionality, often relying on frequency counts or time-series trends, the LLM-based approach of at least one embodiment described herein utilizes the (full) syntactic and/or semantic context of sequences. Some embodiments assess deviations against a trained LLM, enabling a thorough detection by incorporating session history, interdependencies between actions, and metadata into the evaluation. This approach enables the LLM to provide precise threat detection with actionable insights, identifying not just anomalies but the specific context in which they occur, enhancing both detection accuracy and interpretability.

By pinpointing anomalies down to the token level within the sequence, at least one embodiment described herein provides detailed, token-specific explanations for each detection, which may empower users with insights that are highly actionable and/or contextually rich.

At least one embodiment described herein improves upon standard approaches for anomaly detection, for example, statistical-based anomaly detection, in which a dynamic baseline is created for which an occurrence counter is calculated indexed by a set of keys, for example, user, event name, and IP. If an event is out of distribution, then an alert is raised. Using LLMs for anomaly detection according to at least one embodiment described herein improves upon traditional methods, such using statistical, rule-based, and/or time-series models focused on numerical deviations. These prior approaches typically lack the ability to capture the nuanced, context-rich patterns that LLMs excel at detecting, especially in structured logs where syntax, semantics, and sequence matter. Adapting LLMs to the domain of anomaly detection is technically challenging, requiring rethinking operation of LLMs beyond natural language tasks like text generation, summarization, or classification. Here, the LLM may be repurposed to evaluate a unique "log language" by computing a custom distance function between standard text patterns and these specialized logs. This adaptation is challenging and atypical, especially in high-volume environments, but recent advances in model optimization and hardware capabilities have made this innovative approach feasible at scale.

Some examples of existing approaches for anomaly detection and improvement of at least one embodiment described herein over the existing approaches are now described:

Statistical and Rule-Based Models: In contrast to rigid rule-based systems, the LLM-based embodiments described herein may adapt to new patterns without needing predefined thresholds. This may reduce maintenance and/or false positive rate.

Rule-Based Threat Detection Systems: Traditional systems often rely on predefined rules and thresholds to detect known threats. Such traditional approaches lack flexibility and struggle with unseen patterns. In contrast, the LLM-based embodiments described herein may dynamically learn activity patterns and/or may identify new threats based on deviations from learned behaviors rather than relying on fixed rules. The LLM-based embodiments described herein may be effective in handling novel and/or evolving malicious attack methods.

Time-Series Anomaly Detection: Existing models like ARIMA or LSTM detect deviations in metrics, suitable for trend-based anomalies. However, such prior approaches lack the context-awareness for sequence patterns. The LLM-based embodiments described herein may analyze event sequences in logs, which may enable capturing nuanced, behavior-based threats that a traditional time-series model would miss.

Practical applications provided by at least one embodiment described herein include:

Handling Unseen Events: At least embodiment described herein leverages the semantic understanding of the LLM to assess whether an unfamiliar event aligns with established patterns. By analyzing the event's semantic representation rather than relying on a fixed set of keys using existing approaches, first-time events may be handled without flagging them as anomalies simply due to novelty.

Contextual Analysis of Event Sequences: Instead of evaluating events in isolation as done using existing approaches, at least embodiment described herein considers sequences of events, capturing context that single-event analysis cannot. For example, an event may appear benign individually but signal an anomaly within a specific sequence. In contrast, traditional methods struggle to analyze sequences effectively due to the high dimensionality and sparsity of event distributions in log data, making accurate context-based detection challenging.

Granular Anomaly Scoring: At least embodiment described herein provides a precise, interpretable anomaly score on a per-token level, which may specifically highlight where the anomaly occurs within a session. Unlike traditional models that output a single, aggregated metric, the granular approach based on at least embodiment described herein may identify specific malicious artifacts without being overshadowed by surrounding normal activity. This may offer a more actionable and/or fine-grained view of potential threats.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
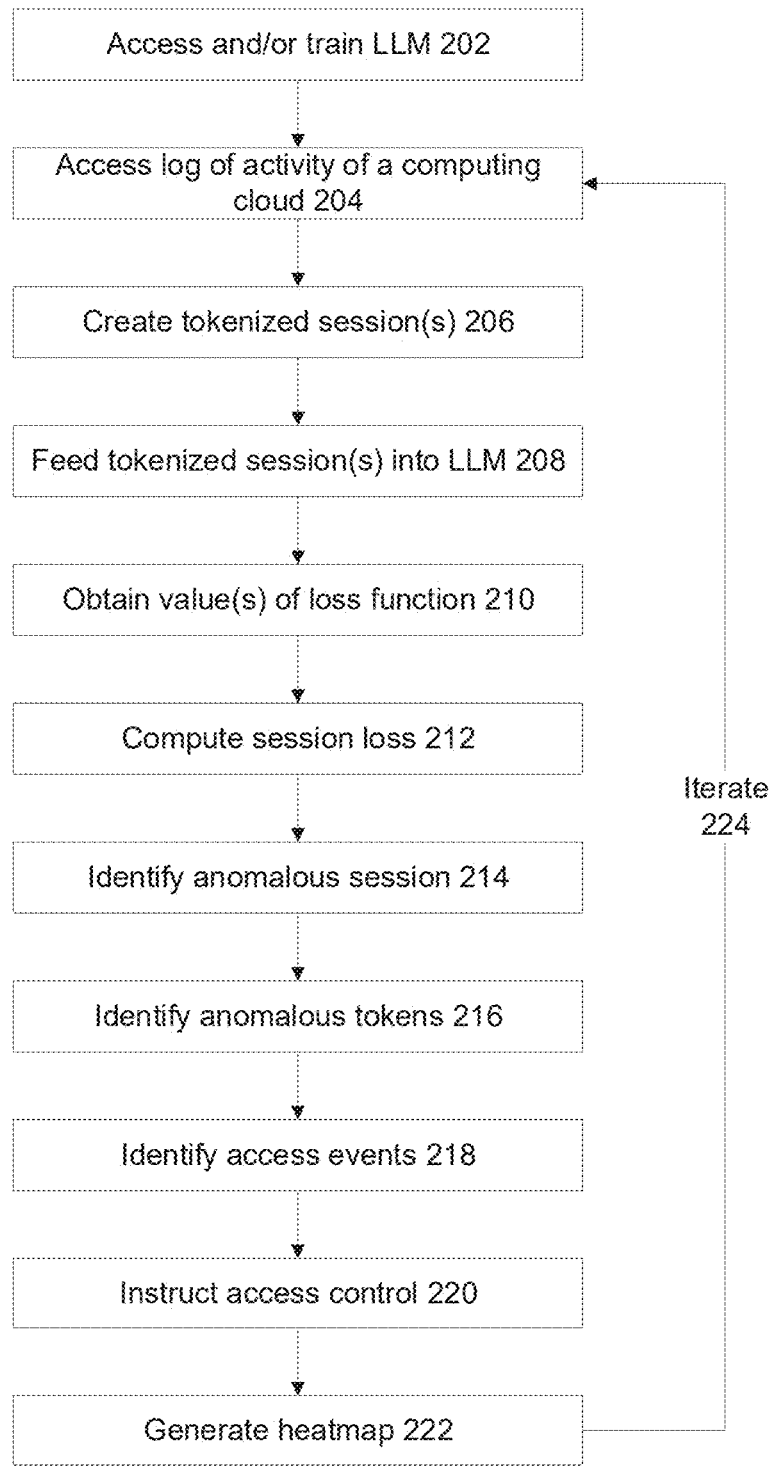
FIG. 2 is a flowchart of a method of using a LLM for detecting an anomaly in a session of a target computing environment, in accordance with some embodiments of the present invention.
Figure 3:
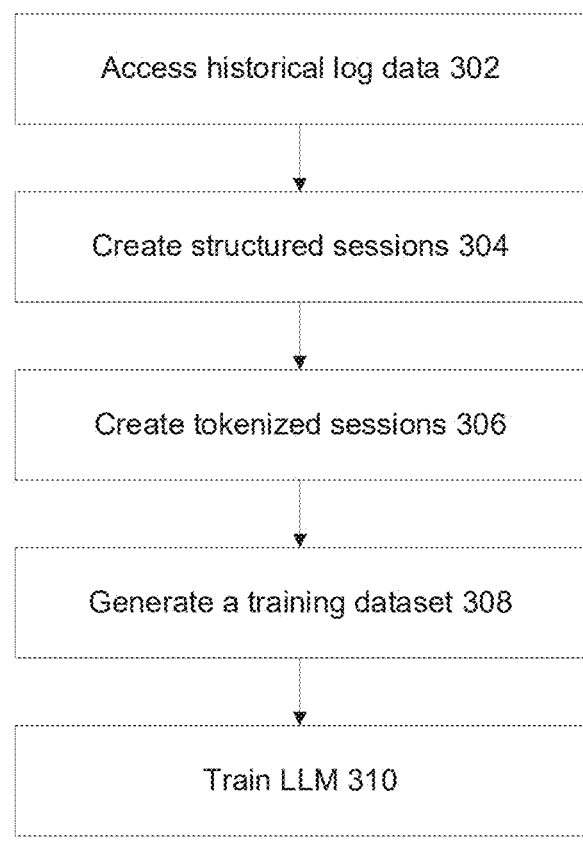
FIG. 3 is a flowchart of a method for training a LLM for detecting an anomaly in a session of a target computing environment, in accordance with some embodiments of the present invention.
Figure 6:
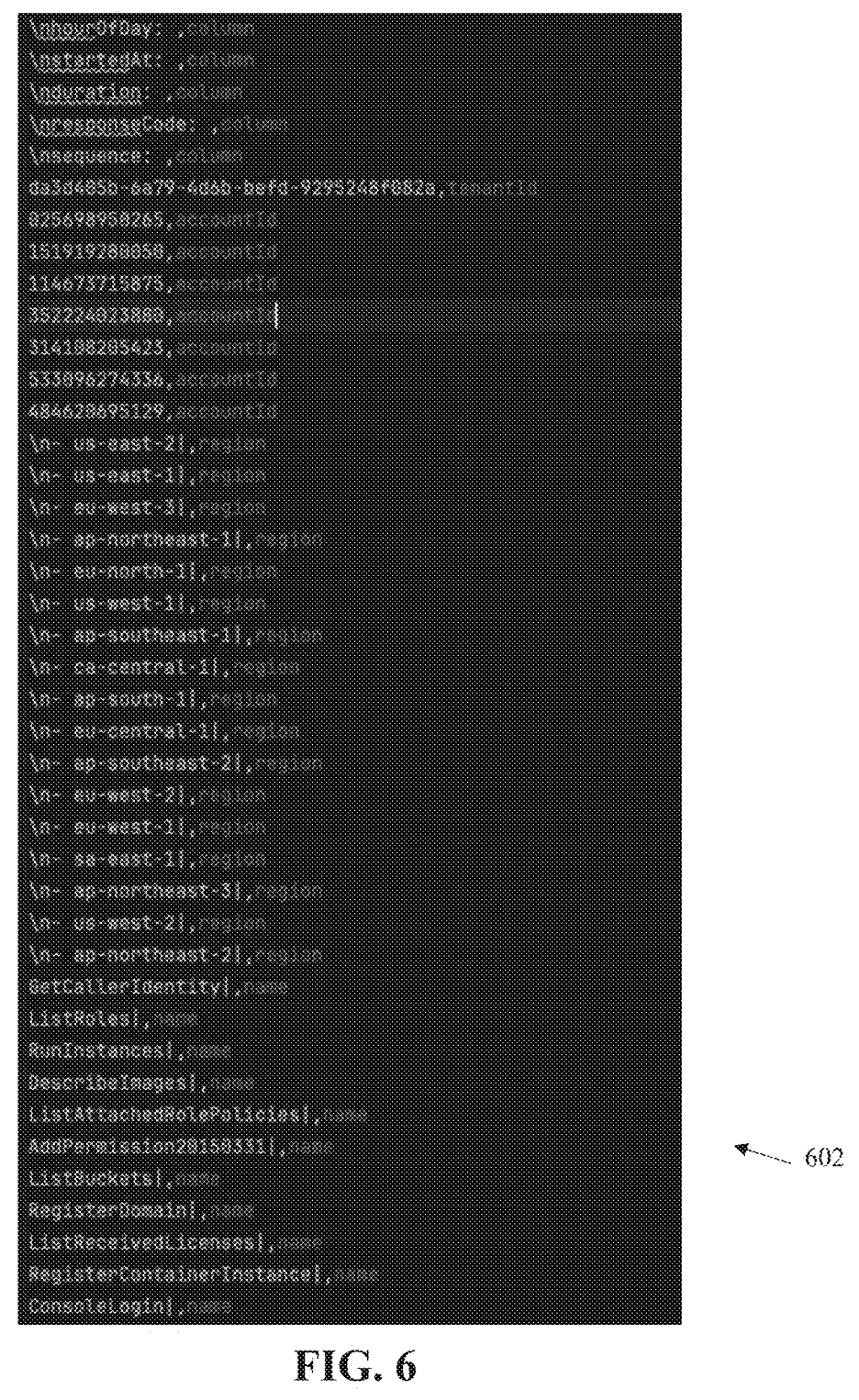
Figure 8:
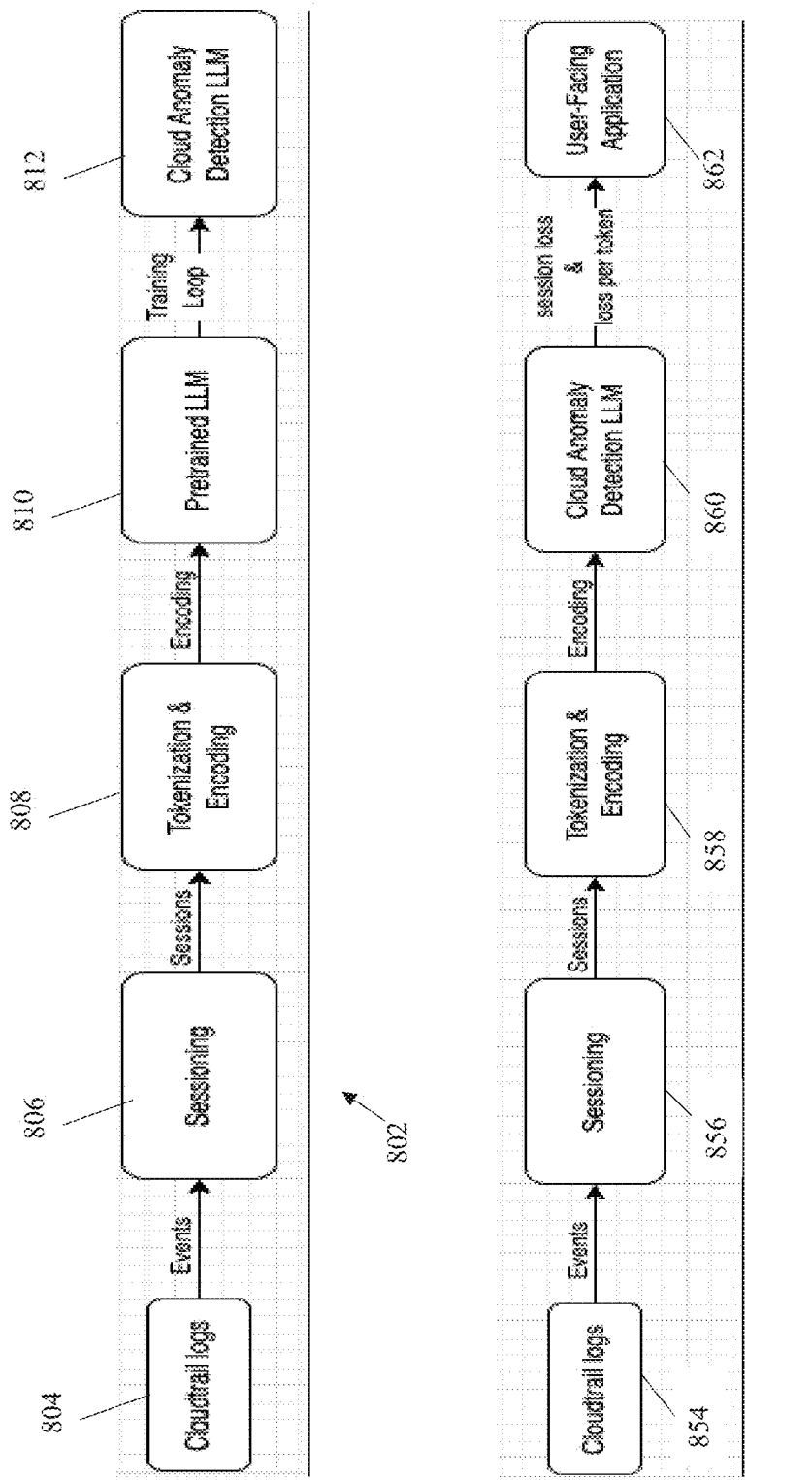
FIG. 8 includes an exemplary dataflow for training of the LLM for detection of an anomaly in a computing cloud session, and an exemplary dataflow for inference by the LLM for detection of the anomaly in the computing cloud session, in accordance with some embodiments of the present invention.

Reference is now made to FIG. 1, which is a block diagram of components of a system 100 for using a LLM 122A for detecting an anomaly in a session of a target computing environment 118, in accordance with some embodiments of the present invention. Reference is also made to FIG. 2, which is a flowchart of a method of using a LLM for detecting an anomaly in a session of a target computing environment, in accordance with some embodiments of the present invention. Reference is also made to FIG. 3, which is a flowchart of a method for training a LLM for detecting an anomaly in a session of a target computing environment, in accordance with some embodiments of the present invention. Reference is also made to FIG. 4, which is an example of a structured session 402, in accordance with some embodiments of the present invention. Reference is also made to FIG. 5, which includes examples of customized tokens 502, in accordance with some embodiments of the present invention. Reference is also made to FIG. 6, which includes additional examples of customized tokens 602, in accordance with some embodiments of the present invention. Reference is also made to FIG. 7, which is an example of a heatmap 702, in accordance with some embodiments of the present invention. Reference is also made to FIG. 8, which includes an exemplary dataflow 802 for training of the LLM for detection of an anomaly in a computing cloud session, and an exemplary dataflow 852 for inference by the LLM for detection of the anomaly in the computing cloud session, in accordance with some embodiments of the present invention.

Referring now back to FIG. 1, system 100 may implement the acts of the method described with reference to FIGS. 2-3, by processor(s) 102 of a computing environment 104 executing code instructions stored in a memory 106 (also referred to as a program store).

Computing environment 104 may be implemented as, for example one or more and/or combination of: a group of connected devices, a client terminal, a server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Computing environment 104 may use LLM 122A for analyzing log files 150 of one or more target computing environments 118 for detecting an anomaly in a session, optionally at a token-level, where the anomaly may indicate malicious activity and/or pose a cybersecurity risk, as described herein.

Target computing environment(s) 118 may be implemented as a platform that hosts services and/or resources which are accessed by multiple users which may be external users (accessing via the network, via a virtual interface such as an application programming interface (API) and the like), for example, a computing cloud, a server, a network, and the like.

Multiple architectures of system 100 based on computing environment 104 may be implemented. For example:

Computing environment 104 executing stored code instructions 106A, may be implemented as one or more servers (e.g., network server, web server, a computing cloud, a virtual server) that provides centralized services to one or more target computing environments 118 and/or client terminals 108, for centrally analyzing log files 150 of the target computing environment(s) 118 using LLM 122A for detecting an anomaly in a session, optionally at a token-level. Services may be provided, for example, to one or more target computing environment(s) 118 and/or client terminal(s) 108 over network 110, by accessing and/or being provided the log file(s) 150 associated with the target computing environment(s) 118. Services may be provided by computing environment 104 to client terminals 108 and/or target computing environment(s) 118, for example, as software as a service (SaaS), a software interface (e.g., application programming interface (API), software development kit (SDK)), an application for local download to the client terminal(s) 108 and/or server(s) 118, an add-on to a web browser running on client terminal(s) 108 and/or target computing environment(s) 118, and/or providing functions using a remote access session to the client terminals 108 and/or target computing environment(s) 118, such as through a web browser executed by client terminal 108 and/or target computing environment(s) 118 accessing a web sited hosted by computing environment 104. For example, client terminal(s) 108 may access log file(s) 150 of target computing environment(s) 118, and provide the log file(s) 150 to computing environment 104. In another example, computing environment remotely accesses log file(s) 150 of target computing environment(s) 118. In yet another example, target computing environment(s) 118 uploads its log file(s) 150 to computing environment 104.

In another example, computing environment 104 may be implemented to provide dedicated and/or local services to a certain target computing environment 118. For example, computing environment 104 may be integrated with target computing environment 118, such as installed thereon and/or code 106 of computing environment 104 may be executed by the processor(s) of target computing environment 118. In another example, computing environment 104 may be implemented as an external device, such as an administrative server, in dedicated communication with target computing environment 118, to provide the service of analyzing log files 150 of the target computing environment(s) 118 using LLM 122A for detecting an anomaly in a session, optionally at a token-level.

Generation of training dataset 122B for training LLM 122A, and/or training of LLM 122A using training dataset 122B, as described herein, may be performed, for example, by computing environment 104 and/or by another external device and provided to computing environment 104

Processor(s) 102 of computing environment 104 may be hardware processors, which may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIG. 2 and/or FIG. 3 when executed by hardware processor(s) 102.

Computing environment 104 may include a data storage device 122 for storing data, for example, LLM 122A, and/or training dataset 122B for training LLM 122A, as described herein. Data storage device 122 may be implemented as, for example, a memory, a local hard-drive, virtual storage, a removable storage unit, an optical disk, a storage device, and/or as a remote server and/or computing cloud (e.g., accessed using a network connection).

Network 110 may be implemented as, for example, the internet, a local area network, a virtual network, a wireless network, a cellular network, a local bus, a point to point link (e.g., wired), and/or combinations of the aforementioned.

Computing environment 104 may include a network interface 124 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing environment 104 includes and/or is in communication with one or more user interfaces 126, which may present the results of the LLM 122A, optionally a heatmap, as described herein. User interface 126 may be designed to enable input of data, for example, for selection of the log file 150 to analyze. Exemplary user interfaces 126 include, for example, one or more of, a touchscreen, a display, gesture activation devices, a keyboard, a mouse, and voice activated software using speakers and microphone.

Referring now back to FIG. 2, at 202, a LLM is accessed and/or trained.

At 204, a log of activity of one or more sessions of the computing cloud is accessed.

The log of activity may be obtained for one or more accounts (e.g., users, tenants) of the computing cloud.

The log of activity may be obtained in real-time, for the current session associated with an account being currently used, for example, one or more users of the account are accessing data and/or services hosted by the computing cloud.

The log of activity may include raw (e.g., non-filtered) log data for accounts of the computing cloud.

The log of activity may be structured to create multiple structured sessions.

Optionally, related events are aggregated and/or structured into one or more sessions, also referred to herein as structured sessions. Related events may be aggregated and/or structured into respective single sessions. The events that are aggregated and/or structured into sessions may include access events, and/or may be based on at least one of the following identifiers: a common resource name, maximal time window between consecutive access events that indicates tokens belong to a same access event, and associated with an access token to designate a new connection.

The process of aggregating and/or structuring related events into sessions may be implemented slightly differently for human identities than for non-human (e.g., system) identities, to account for their different behavior.

The session(s) may be structured to a data serialization language, for example, YAML. The structuration to the data serialization language may reduce the number of tokens to be processed by the LLM.

Referring now back to FIG. 4, the example of structured session 402 is presented.

Referring now back to FIG. 2, at 206, the sessions (optionally structured sessions) are tokenized into tokenized sessions. Each respective session may be tokenized into a respective tokenized session.

The tokenized sessions may include syntactic and/or semantic context of sequences of tokens of the sessions.

Custom tokens may be added following the tokenization. The custom tokens may be characterized by a high recurrence and/or semantic insignificance (such as generated IDs). The custom tokens may be selected for indicating domain-specificity and/or according to identifiers without semantic significance. Examples of domain-specificity include: event names, event resources, and field names. Examples of identifiers without semantic significance include: account ID. The custom tokens may be categorized into field names and/or may have the following distinct values: accountIDs, tenantIDs, Cloud Regions, event names, event sources, and response codes.

The customized tokens may be added using a Transformers.Tokenizer add_tokens API, which is designed for adding custom tokens and/or resizing the LLM's tokens embedding accordingly.

The total number of custom tokens may be, for example, about 100-5000, or about 750-1024, or about 500-1500, or other ranges.

The tokenization may be performed, for example, using byte-pair encoding (BPE). BPE is a sub-word tokenization method commonly used in natural language processing (NLP) for breaking down text into smaller, more manageable pieces. BPE is designed to balance vocabulary size and token efficiency, which may be used in languages with rich morphology and/or diverse character sets, which may be obtained by adding custom tokens.

Potential advantages of using customized tokens for tokenization of the sessions include: reducing the number of tokens which reduces processing time of a processor running the LLM, and/or disconnecting prior connotations (e.g., encoding) for those tokens.

Referring now back to FIG. 5, examples of customized tokens 502 are presented.

Referring now back to FIG. 6, additional examples of customized tokens 602 are presented.

Referring now back to FIG. 2, at 208, the tokenized sessions are fed into the LLM.

Optionally, the tokenized sessions are fed into the LLM as a sequence. The sequence may be according to the sequence as recorded in the log of activity. The sequence may be according to timestamps associated with the tokens.

Optionally, each tokenized session, such as of each account of the computing cloud, may be fed into the LLM. Alternatively, multiple tokenized sessions, such as of multiple accounts of the computing cloud, may be fed into the LLM.

At 210, a value of a loss function may be obtained from the LLM. The value of the loss function may be a numerical value.

The loss function may be, for example, a customized distance function between standard text patterns and tokens computed from structured sessions of activity logs of computing clouds.

The value of the loss function may be obtained per token of the tokenized session(s) (optionally tokenized structured session(s)) fed into the LLM.

A higher value of the loss function may indicate increasing probability of an unpredictable value, such as increasing probability of deviation from "normal" and/or an expected outcome, which may indicate increasing probability of an abnormality. The higher the value of the loss function, the lower the probability that the corresponding token is to be found within its current position in a sequence of tokens of the session. The larger the value of the loss value the greater is its abnormality.

The loss function may be the loss function used during training (e.g., fine-tuning) of the LLM, for example, as described with reference to 310 of FIG. 3. The loss function may be a cross-entropy loss.

At 212, a session loss may be computed for each respective session (optionally each structured session). The value of the session loss may be a numerical value.

The session loss may be, for example, a customized distance function between standard text patterns and tokens computed from structured sessions of activity logs of computing clouds.

The session loss may be computed as an aggregation of the loss function for tokens associated with the respective session. For example, the session loss may be computed as one or more of: a sum of the loss function for tokens associated with the session, an average of the loss function for tokens associated with the session, a weighted value the loss function for tokens associated with the session where certain custom tokens are assigned higher weights than other custom tokens (e.g., certain custom tokens may be more correlated with increased risk of a security threat than other tokens), and similarity to one or more predefined patterns of sequences of loss functions for tokens (e.g., certain sequences of tokens may be more correlated with increased risk of a security threat than other tokens).

The loss function may be processed to compute a session loss function that normalizes loss amplitude of super-fields, for example, identity fields, fingerprint fields, and sequence fields.

At 214, the session loss, optionally per respective session, may be evaluated to determine whether the session loss meets a first requirement, for example, greater than a first threshold.

A higher value of the session loss may indicate increasing probability of an unpredictable value, such as increasing probability of deviation from "normal" and/or an expected outcome, which may indicate increasing probability of an abnormality in the session. The higher the value of the session loss the greater the probability that the session is an anomalous session, i.e., including an abnormality therein. The first threshold may be selected, for example, as a tradeoff between accuracy of detecting abnormalities, while reducing likelihood of false detections.

The session associated with the session loss meeting the first requirement may be identified as including an anomaly, which may be associated with a security risk. The identified session associated with the session loss meeting the first requirement may be referred to as an anomalous session.

The security risk may be, for example, malicious actions by a human, malicious actions by a robot and/or malware, attempt to steal data, attempt to manipulate data, and the like.

Examples of anomalies of anomalous sessions include: unexpected API call sequence, unusual account activity, deviations in access patterns across services, a listing of an S3 bucket following an unauthorized IAM role assumption, co-occurrence of specific API calls with anomalous IP addresses, and specific API calls occurring during unusual timeframe of activity.

At 216, one or more tokens of the anomalous sessions may be identified. The tokens may be identified on the basis of being associated with a value of the loss function meeting a second requirement, for example, greater than a second threshold. The identified tokens associated with the value of the loss function meeting the second requirement may be referred to herein as anomalous tokens.

The anomalous token(s) may indicate the anomaly of the anomalous session.

The anomalous token(s) may represent the security risk of the anomalous session.

At 218, one or more access events of the anomalous session and/or associated with the anomalous token(s) may be identified.

The identified access event may be associated with the security risk.

Examples of access events include: an attempt to access data hosted by the computing cloud, an attempt to modify data hosted by the computing cloud, an attempt to access a service hosted by the computing cloud, and an attempt to upload data to the computing cloud.

At 220, access control may be instructed for the access event and/or for the anomalous session. For example, the access event and/or anomalous sessions is automatically terminated and/or disconnected, the access event and/or anomalous session is automatically paused until a condition is met such as a validation process, access requirements for the session are hardened (e.g., the current access requirements are re-evaluated in terms of the hardened requirements, and the validation process may be triggered accordingly), a user is requested to undergo a validation procedure to proceed with the access event and/or anomalous session, a security application is automatically triggered to scan the access event and/or anomalous session and/or associated data for malware and/or security breaches, the access event and/or anomalous session may be executed in a sandbox, an alert on an administrative server may be generated requesting a review by an administrator, and the like.

At 222, a heatmap of the tokens associated with the anomalous session may be generated.

The heatmap may be generated for depicting anomalous tokens and/or non-anomalous tokens. Each respective token of the session may be visually indicated according to the value of the loss function computed for the respective token. This may enable visualizing the location of the anomalous tokens within the tokens (anomalous and non-anomalous) of the session. For example, possible values of the loss function may be divided into intervals. Each interval may be assigned a different color. Colors above a threshold (e.g., first threshold and/or second threshold) and below the threshold may be distinct. For example, colors for tokens above the threshold may be based on a first color such as red to indicate a warning, such as red, orange, yellow, and the like. Colors for tokens below the threshold may be based on a second color such as green and/or blue to indicate normal values, such as blue, green, purple, and the like. In another example, anomalous tokens may be based on the first color, and non-anomalous tokens may be based on the second color.

The heatmap may be presented on a display, optionally of a client terminal, for example, connected to an administrative server monitoring the computing cloud. Alternatively or additionally, the heatmap may be fed into another process, for example, a machine learning model trained to analyze the heatmap to provide automated access control, for example, one or more access control features described herein.

Referring now back to FIG. 7, heatmap 702 of tokens computed for a session is presented. Tokens highlighted with increasing dark highlight may indicating increasing likelihood of being anomalous.

Referring now back to FIG. 2, at 224, one or more features described with reference to 204-224 may be iterated. The iterations may be dynamic and/or in real time, such as per new session, and the like.

Referring now back to FIG. 3, at 302, a historical log data of the computing cloud may be accessed. The historical log data may include raw (e.g., non-filtered) historical log data.

The historical log may be of a time interval, for example, the last 15 days, or 30 days, or 60 days, and the like. The historical log may be of different sessions of the computing cloud. The historical log may be of different accounts of the computing cloud, for example, different users and/or different tenants.

At 304, structured sessions may be created by structuring the historical log data according to related events, for example, with reference to 204 of FIG. 2.

At 306, tokenized sessions may be created from the structured sessions. An exemplary approach for tokenizing sessions (optionally structured sessions) to create tokenized sessions is described, for example, with reference to 206 of FIG. 2.

At 308, a training dataset based on the tokenized sessions may be created.

Optionally, the tokenized sessions may be labelled with a ground truth using an active learning approach and/or non-supervised approach and/or semi-supervised approach, where the LLM actively participates in generating labels by selecting the structured sessions meeting the first requirement (e.g., above the first threshold) and/or selecting tokens meeting the second requirement (e.g., above the second threshold). It is noted that the first requirement may be used for selecting the anomalous sessions as described with reference to 214 and/or the second requirement may be used for selecting the anomalous tokens as described with reference to 216 of FIG. 2. The selected tokens and/or sessions may be automatically labelled as anomalous, and/or may be presented on a display for manual review and/or manual annotation and/or confirmation of the automatic annotation. The aforementioned approach may be useful in situations where a small number of anomalies are to be identified in a large dataset, where manual labelling is expensive and/or time-consuming.

At 310, the LLM is trained on the training dataset of tokenized sessions.

The LLM is trained for detecting an anomaly on a token level and/or on a session level, optionally for detecting an anomalous session(s) and/or anomalous token(s). The anomaly may indicate an access event posing a security risk within the computing cloud.

The LLM may be trained by fine-tuning and/or a pre-trained LLM to create the LLM for detecting the anomaly indicating the security risk. The pre-trained LLM may be pre-trained on a corpus of human readable natural language text. The pre-trained LLM may not have been pre-trained on log activity data and/or other data similar to log activity data.

The fine-tuning may be performed by adjusting a loss function to output a cross-entropy loss on a token level.

The LLM may be based on a suitable architecture, optionally based on a neural network, for example, transformer-based architecture, autoregression model, encoder-decoder architecture, and the like.

Referring now back to FIG. 8, exemplary dataflow 802 is for training of the LLM for detection of an anomaly in a computing cloud session. Dataflow 802 may be based on, and/or correspond to, and/or include features of, and/or be integrated with, features described with reference to FIG. 3.

At 804, logs of activity of a computing cloud are obtained, for example, as described with reference to 302 of FIG. 3.

At 806, the logs may be aggregated based on events into structured sessions, for example, as described with reference to 304 of FIG. 3.

At 808, the structured sessions may be tokenized and/or encoded, for example, as described with reference to 306 of FIG. 3.

At 810, the tokenized and/or encoded structured sessions are used to train the LLM, optionally fine-tuning a pre-trained LLM. For example, as described with reference to 310 of FIG. 3.

At 812, the LLM is provided for inference.

Exemplary dataflow 852 is for inference by the LLM for detection of the anomaly in the computing cloud session. Dataflow 852 may be based on, and/or correspond to, and/or include features of, and/or be integrated with, features described with reference to FIG. 2.

At 854, logs of activity of a computing cloud are obtained, for example, as described with reference to 204 of FIG. 2.

At 856, the logs may be aggregated based on events into structured sessions, for example, as described with reference to 204 of FIG. 2.

At 858, the structured sessions may be tokenized and/or encoded, for example, as described with reference to 206 of FIG. 2.

At 860, the tokenized and/or encoded structured sessions are fed into the LLM, for example, as described with reference to 208 of FIG. 2. Values of the loss function may be computed per token, for example, as described with reference to 210 of FIG. 2. A session loss may be computed per session, for example, as described with reference to 212 of FIG. 2.

At 862, the values of the loos function and/or the session loss may be processed by one or more user-facing applications. An anomalous session may be identified, for example, as described with reference to 214 of FIG. 2. Alternatively or additionally, anomalous tokens may be identified, for example, as described with reference to 216 of FIG. 2. Alternatively or additionally, anomalous access events may be identified, for example, as described with reference to 218 of FIG. 2. Alternatively or additionally, access control may be instructed, for example, as described with reference to 220 of FIG. 2. Alternatively or additionally, a heatmap may be generated, for example, as described with reference to 222 of FIG. 2.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant LLMs will be developed and the scope of the term LLM is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of using a large language model (LLM) for controlling access to a computing cloud, comprising:
    structuring an activity log of the computing cloud to create a plurality of structured sessions;
    tokenizing the plurality of structured sessions into a plurality of tokenized sessions;
    feeding a sequence of the plurality of tokenized sessions into the LLM, wherein the sequence of the plurality of tokenized sessions is selected for including syntactic and/or semantic context of the plurality of sessions;
    obtaining from the LLM, a loss function per token of the plurality of tokenized sessions;
    computing a session loss for each respective session of the plurality of sessions, the session loss computed as an aggregation of the loss function for tokens associated with the respective session;
    identifying a session including an anomaly associated with a security risk when the session loss of the session is greater than a first threshold;
    for the identified session, identifying at least one token having the loss function greater than a second threshold, wherein the identified at least one token denotes the anomaly associated with the security risk;
    identifying at least one access event associated with the identified at least one token denoting the anomaly, the at least one access event associated with the security risk;
    instructing access control for the at least one access event, the instructing comprising automatically terminating the access event; and
    wherein the LLM output positional logits, and further comprising converting the positional logits to vocabulary probabilities for each position, and computing a negative log-likelihood for an index corresponding to a true label, wherein concatenation of the output positional logits yields a loss per token list corresponding to positional session tokens.

2. The computer implemented method of claim 1, wherein the loss function is computed as a distance function between standard text patterns and tokens computed from structured sessions of activity logs of computing clouds.

3. The computer implemented method of claim 1, wherein the LLM is trained by:
    accessing a historical log data of a computing cloud;
    structuring the historical log data into a plurality of structured session;
    tokenizing the plurality of structured sessions into a plurality of tokenized sessions; and
    fine-tuning a pre-trained LLM on the plurality of tokenized sessions, wherein the pre-trained LLM is pre-trained on a corpus of human readable natural language text.

4. The computer implemented method of claim 1, further comprising:
    terminating the session for reducing or preventing the security risk.

5. The computer implemented method of claim 1, further comprising:
    for the session associated with the anomaly, generating a heatmap of the plurality of tokens associated with the session, each respective token is visually indicated according to the loss function of the respective token.

6. The computer implemented method of claim 1, further comprising:
    structuring the log into a plurality of structured sessions;
    wherein tokenizing comprises tokenizing the plurality of structured sessions into a plurality of tokenized sessions.

7. The computer implemented method of claim 3, wherein the session associated with the anomaly includes at least one of: unexpected API call sequence, unusual account activity, deviations in access patterns across services, a listing of an S3 bucket following an unauthorized IAM role assumption, co-occurrence of specific API calls with anomalous IP addresses, and specific API calls occurring during unusual timeframe of activity.

8. The computer implemented method of claim 1, wherein each session of the plurality of sessions comprises an aggregation of a plurality of related access events into a single session.

9. The computer implemented method of claim 8, access events are aggregated into the single session based on at least one of: a common resource name, maximal time window between consecutive access events that indicates tokens belong to a same access event, and association with an access token to designate a new connection.

10. The computer implemented method of claim 1, wherein the tokenizing is performed by adding custom tokens indicating domain-specificity, and/or identifiers without semantic significance.

11. The computer implemented method of claim 10, wherein the tokenization is performed by byte-pair encoding tokenization followed by adding the custom tokens.

12. A computer implemented method of using a large language model (LLM) to control access to a computing cloud, comprising: structuring an activity log of the computing cloud to create a plurality of structured sessions;
    tokenizing the plurality of structured sessions into a plurality of tokenized sessions;
    feeding a sequence of the plurality of tokenized sessions into the LLM, wherein the sequence of the plurality of tokenized sessions is selected for including syntactic and/or semantic context of the plurality of sessions;
    obtaining from the LLM, a loss function per token of the plurality of tokenized sessions; computing a session loss for each respective session of the plurality of sessions, the session loss computed as an aggregation of the loss function for tokens associated with the respective session;

identifying a session including an anomaly associated with a security risk when the session loss of the session is greater than a first threshold;

for the identified session, identifying at least one token having the loss function greater than a second threshold, wherein the identified at least one token denotes the anomaly associated with the security risk;

for the session associated with the anomaly, generating a heatmap of the plurality of tokens associated with the session, each respective token is visually indicated according to the loss function of the respective token; and automatically terminating the identified session associated with the anomaly;

wherein the LLM output positional logits, and further comprising converting the positional logits to vocabulary probabilities for each position, and computing a negative log-likelihood for an index corresponding to a true label, wherein concatenation of the output positional logits yields a loss per token list corresponding to positional session tokens.

* * * * *